United States Patent
Moskowitz

(10) Patent No.: US 7,253,734 B2
(45) Date of Patent: Aug. 7, 2007

(54) SYSTEM AND METHOD FOR ALTERING OR DISABLING RFID TAGS

(75) Inventor: Paul A. Moskowitz, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/332,613

(22) Filed: Jan. 13, 2006

(65) Prior Publication Data

US 2006/0132313 A1    Jun. 22, 2006

Related U.S. Application Data

(63) Continuation-in-part of application No. 10/946,975, filed on Sep. 22, 2004.

(60) Provisional application No. 60/732,273, filed on Nov. 1, 2005.

(51) Int. Cl.
G08B 13/14 (2006.01)

(52) U.S. Cl. ............... 340/572.3; 340/572.7; 343/842

(58) Field of Classification Search ........... 340/572.1, 340/572.3, 572.7; 343/841–842
See application file for complete search history.

(56) References Cited

U.S. PATENT DOCUMENTS

| | | | |
|---|---|---|---|
| 3,713,148 A | 1/1973 | Cardullo et al. | |
| 4,673,923 A * | 6/1987 | Boscoe et al. | 340/572.3 |
| 5,469,142 A * | 11/1995 | Bergman et al. | 340/572.3 |
| 5,574,431 A * | 11/1996 | McKeown et al. | 340/572.3 |
| 6,050,622 A * | 4/2000 | Gustafson | 340/572.1 |
| 6,466,131 B1 | 10/2002 | Tuttle et al. | |
| 6,796,508 B2 * | 9/2004 | Muller | 235/492 |
| 7,034,689 B2 * | 4/2006 | Teplitxky et al. | 340/572.7 |
| 7,098,794 B2 * | 8/2006 | Lindsay et al. | 340/572.3 |
| 2002/0003496 A1 | 1/2002 | Brady | |
| 2002/0067264 A1 * | 6/2002 | Soehnlen | 340/572.1 |
| 2003/0080853 A1 | 5/2003 | Tuttle | |
| 2004/0189470 A1 * | 9/2004 | Girvin et al. | 340/572.8 |
| 2005/0128087 A1 * | 6/2005 | Claessens et al. | 340/572.3 |
| 2005/0212674 A1 * | 9/2005 | Desmons et al. | 340/572.7 |
| 2006/0017545 A1 * | 1/2006 | Volpi et al. | 340/10.4 |

FOREIGN PATENT DOCUMENTS

| | | |
|---|---|---|
| FR | 2863748 A1 | 6/2005 |
| WO | WO 0277939 A | 3/2002 |
| WO | WO 2005-062247 A | 7/2005 |

* cited by examiner

*Primary Examiner*—Thomas Mullen
(74) *Attorney, Agent, or Firm*—Ference & Associates LLC

(57) ABSTRACT

An arrangement for providing protection to wireless portable transponders (including resonant tags such as RFID tags) from unauthorized interrogation by employing a mechanical arrangement for disabling reception by or from the antenna of the transponder. The tags can be protected from receiving or providing unauthorized or unwanted information. Contemplated are mechanical arrangements that permit the owner to decide when reception/interrogation of personal or other information is not desired by employing the provided mechanical disable control arrangement. Also broadly contemplated herein is the altering interrogation characteristics of RFID tags to such an extent that they may still be read at a close range instead of the original range, and this result of this altering is visible to the user.

23 Claims, 8 Drawing Sheets

# SYSTEM AND METHOD FOR ALTERING OR DISABLING RFID TAGS

CROSS-REFERENCE TO RELATED APPLICATION

This application claims priority from U.S. Patent Application Ser. No. 60/732,273, filed on Nov. 1, 2005, and entitled "System and Method for Disabling RFID Tags," the contents of which are hereby fully incorporated by reference, and which is a continuation-in-part of U.S. patent application Ser. No. 10/946,975 now currently pending, filed on Sep. 22, 2004, and entitled "System and Method for Disabling RFID Tags," the contents of which are hereby fully incorporated by reference.

FIELD OF THE INVENTION

The present invention is related to providing wireless portable transponders, such as cards and RFID tags, with user controlled means for disabling the tags as protection from an unauthorized interrogation. More particularly, the invention provides mechanical means that permit a user to decide to alter or disable a tag and observe that the tag has been effectively altered or disabled when transponder reception/interrogation of personal or other information is undesirable.

BACKGROUND OF THE INVENTION

Portable transponders, employ RFID, Radio Frequency Identification, as the technology used to collect highway tolls, to serve as personal identification for access control, and to provide means for electronic information interchange, such as credit, etc. Passive RFID tags (i.e. tags without internal power sources such as batteries) and wireless cards contain chips, (also known as computer chips, microchips, memory chips) which store identification and other information, such as credit card numbers, financial data, etc. Tags may be applied to items to identify the item in much the same way that bar codes are used for identification purposes. Information is retrieved from a tag as well as the wireless cards of the present invention by an RFID base station or reader when the tag or card is scanned with radio waves by the reader. The tags may draw their power to function from the interrogation field supplied by the base (read/write) station.

Passive tags are described in U.S. Pat. No. 3,713,148, Card Apparatus and System, issued to Cardullo and Parks. In its simplest form the RFID tag or device includes a circuit, typically a silicon chip, although more than one chip may be used in the construction of the RFID device. The circuit is generally connected to an antenna. The RFID device or card may take on a variety of forms including that of a tag, a key fob, or a card. As previously mentioned, a battery may also be employed to extend the range of the device. It is also possible in principle to build devices that function as tags or wireless cards using electrical circuits including only resistors, capacitors and inductors as is well known by those skilled in the art.

Large scale retailers and their suppliers are pursuing Radio Frequency Identification, RFID, tagging for supply chain tracking of goods. Demonstrations of RFID for item tagging will lead to point of sale check out and data collection. For the item tagging application, RFID tags are attached to some part of an item that is being inventoried or is for sale. The attachment may be such that the tag is not visible since the tag may be placed within a container section of the item or packaging material of the item. Removal of the tag after it is no longer useful can become difficult if not impossible for many practical situations. Thus, the tag will in many cases remain attached to the item that has been sold to a customer. This makes it possible for the tag to be read after the point of sale. This in turn leads to a question of the privacy of the purchaser or customer. The issue of privacy is of utmost concern. It is therefore desirable under some circumstances to deactivate or disable the RFID tag after the point of sale without having to physically remove the tag. Deactivation of the tag is one way to assure privacy.

Temporary deactivation of tags may not satisfy privacy concerns. RFID protocol proposals include a kill command that renders the tag inoperable. This kill command is often referred to as a "Privacy" command—which can be used to permanently deactivate the device at the end of its working life, for example as a customer leaves a store. However, there are two problems associated with the kill command. First, the execution of a kill command may be only protected by a short password, 32 bits for example. Organizations using RFID tags are therefore concerned that unauthorized people may (easily) be able to deactivate them even before point of sale. Second, consumers are afraid that the kill command may not permanently "destroy" a tag. The entity who made the tag may also have means to reactivate it.

SUMMARY OF THE INVENTION

An aspect of the present invention, is to provide transponder information exchange privacy and control by providing tag structures that make it possible for a user to mechanically alter the tag in such a way so as to inhibit the ability of a base station or reader to interrogate the RFID tag or transponder by wireless means for those tags that are readily accessible by the holder of the tagged item.

It is also the aim of this invention to provide a system and method for the permanent deactivation or disabling of wireless RFID tags unless electromechanical means are undertaken to reactivate. Such reactivation would require deliberate actions on the part of the owner of the RFID tag to permit the reactivation to take place and could not be undertaken without the owner's knowledge unless the item were either stolen or deliberately left unattended. It is further the aim of this invention to provide a system and method for the visual confirmation that a tag has been deactivated.

Another aspect of the present invention, is to enable a holder of a tag to protect his/her privacy by deactivating the RFID tag at will, while also making it possible for an establishment to interrogate the tag at the holder's discretion by means of mechanical probing.

In order to utilize the methods of disabling to be described we also require a method for manufacturing a wireless RFID tag where these disabling techniques to be described can be utilized. The manufacturing method involves the assembly of a memory chip with an externally accessible antenna connected to the chip. The chip and antenna are mounted on some mounting means such as a non-electrically conducting substrate. The antenna is coupled to the memory chip by way of an electrical conductor passing through an exterior portion of the substrate and at least a portion the externally mounted antenna and the antenna connection in the form of an electrical conductor can be mechanically removed when it is desired to disable interrogation of said RFID tag.

Also broadly contemplated herein is the altering interrogation characteristics of RFID tags to such an extent that they may still be read at a close range instead of the original range, and this result of this altering is visible to the consumer.

In summary, one aspect of the invention provides a method of altering interrogation characteristics of a resonant tag, the method comprising the steps of: obtaining a resonant tag, the resonant tag comprising an antenna; and reducing a read range of the resonant tag via physically compromising at least a portion of the antenna of the resonant tag.

Another aspect of the invention provides a resonant tag kit comprising: a resonant tag; the resonant tag comprising an antenna; and an arrangement for reducing a read range of the resonant tag via physically compromising at least a portion of the antenna.

Furthermore, an additional aspect of the invention provides a method of assembling a resonant tag kit, the method comprising the steps of: providing a resonant tag, the resonant tag comprising an antenna; and providing an arrangement which reduces a read range of the resonant tag via physically compromising at least a portion of the antenna.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

The present invention provides methods, systems and apparatus to protect wireless transponders, such as RFID tags that may be carried on a person, from an unauthorized interrogation. Such tags have means for receiving and storing electronic information, commonly in binary form using memories and/or electronic circuits, typically, but not exclusively such as chips containing 'bits' to store the information. The invention is designed to provide privacy of this type of electronic information and yet permit the information to be queried later through mechanical or ohmic contact at the user's discretion. At the same time the tags can be protected from receiving unauthorized or unwanted information. The invention provides means that permit a user, generally the owner, to decide when reception/interrogation of this personal information is desirable by simple mechanical means. The disabling of the tag to prevent interrogation of the RFID involves physically damaging at least a portion of an interrogation circuit in said RFID tag.

Figure 1:
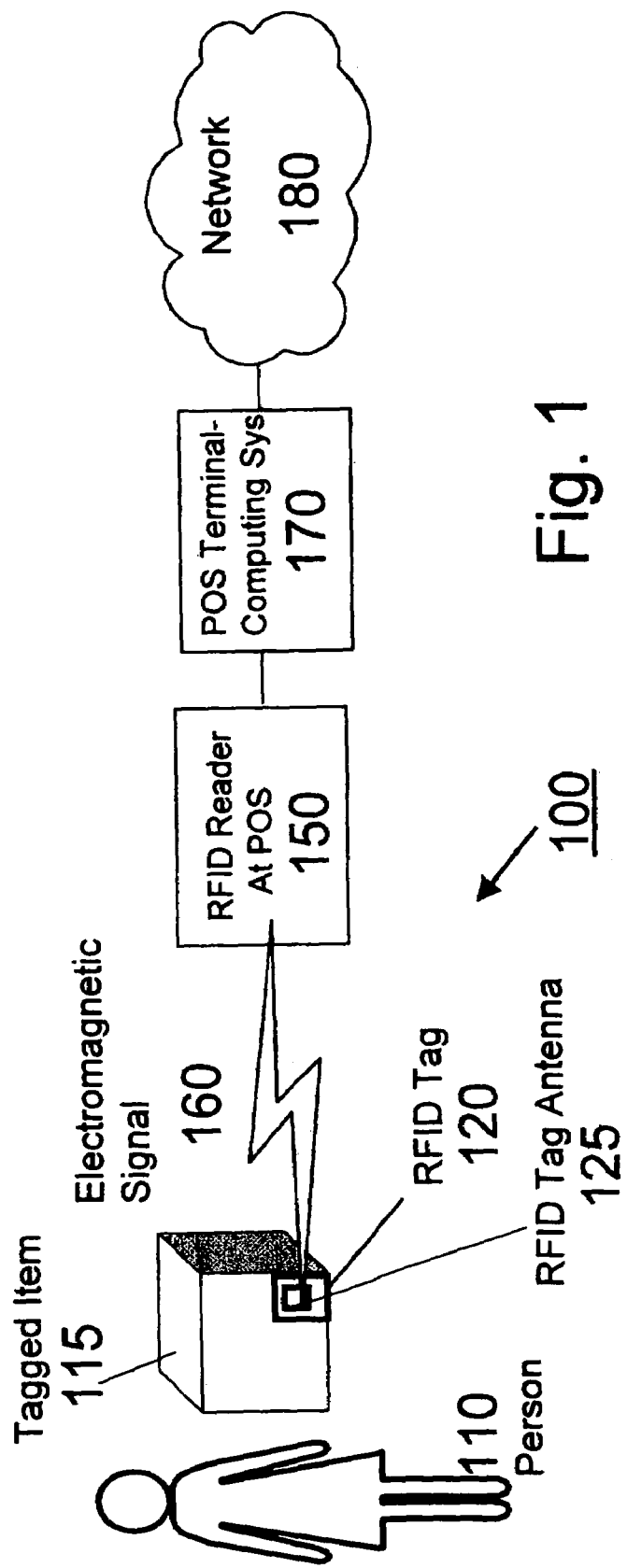
FIG. 1 illustrates an example of a system of the invention.

FIG. 1, illustrates a system of the invention 100. A person or cardholder 110 carries at least one tagged item 115 which has at least one wireless or RFID tag 120 attached to the item 115, the card being interrogated by an RFID reader 150 which may be located at a point-of-sale, POS, terminal, the reading transmitted to a computing network. The RFID tag has an antenna 125 connected to a chip on the tag which provides a means for communication to the chip. The card may be read through the use of an electromagnetic, EM, signal 160 that provides means for communication between the tag 120 and a reader 150. Information received by the reader 150 may be transferred to a computing system 170 where it is processed and stored in a database. The system 170 may in turn be connected to a network 180 which makes possible the exchange of information with other computing systems. In order to protect the privacy of the person 110, the tag 120 is constructed with a built in means for separating the antenna from the chip. Thus, the user may mechanically and electrically disconnect the antenna from the chip, or by physically compromising the functioning of the antenna.

Figure 2:
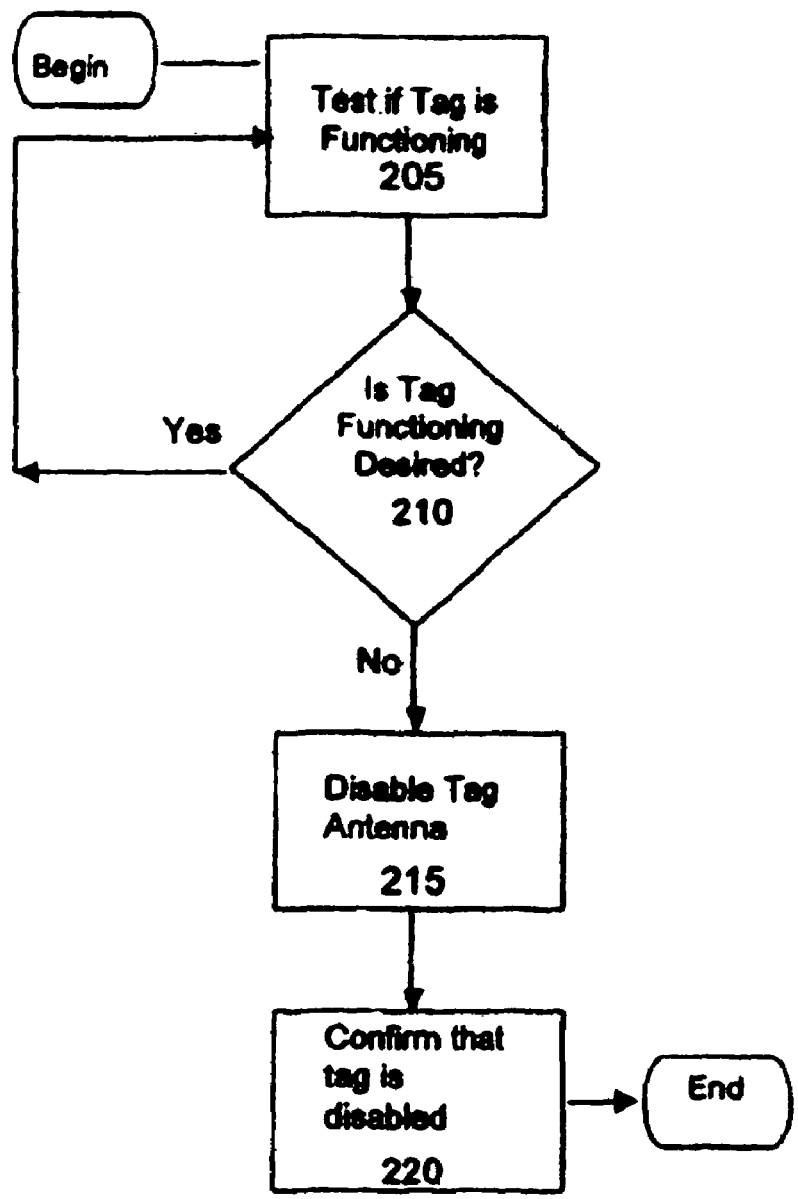
FIG. 2 shows a flow diagram illustrating a disabling function.

FIG. 2 shows a flow diagram 200 illustrating the disable function. In order to be able to assure a consumer that a tag has been deactivated, we provide a method, FIG. 2, wherein there is confirmation of the deactivation of an RFID tag by physical inspection or electronic confirmation. Tags are deactivated by the physical destruction of the tag antenna. This is accomplished by means that are familiar to consumers. Alternatively, tags can be destroyed by destruction of the wiring that is attached to the antenna for those cases where the wiring is accessible to the customer.

In the normal state of use for a tag, the tag is functioning and may be confirmed to be functioning by means of a test 205. The test may consist of placing the tag within the field of an RFID reader, and then using the RFID reader to read information held in the memory of the chip on the RFID tag. If continued functioning is desired 210, no more is done. If the functioning is not desired 210, e.g. the user wishes that the tag may not be read by wireless means, the antenna is disabled 215. The disabling of the antenna is accomplished by mechanical means as described in the figures below. Additionally, the disabling of the antenna function may be confirmed by visual inspection. After the tag is disabled, the disabling may be confirmed by means of a test 220. However, visual inspection is the preferred method to determine the tag has been disabled.

Alternatively, if the object is simply to have the tag disabled, there is no need to first test to see if the tag is enabled. Rather, the mechanical disconnection of the antenna connection to the chip or the mechanical destruction of the antenna itself is adequate to assure that wireless radio signals will not be received and will not be conveyed to the chip. This will disable the tag. The disconnection may be confirmed by visual inspection.

Figure 3:
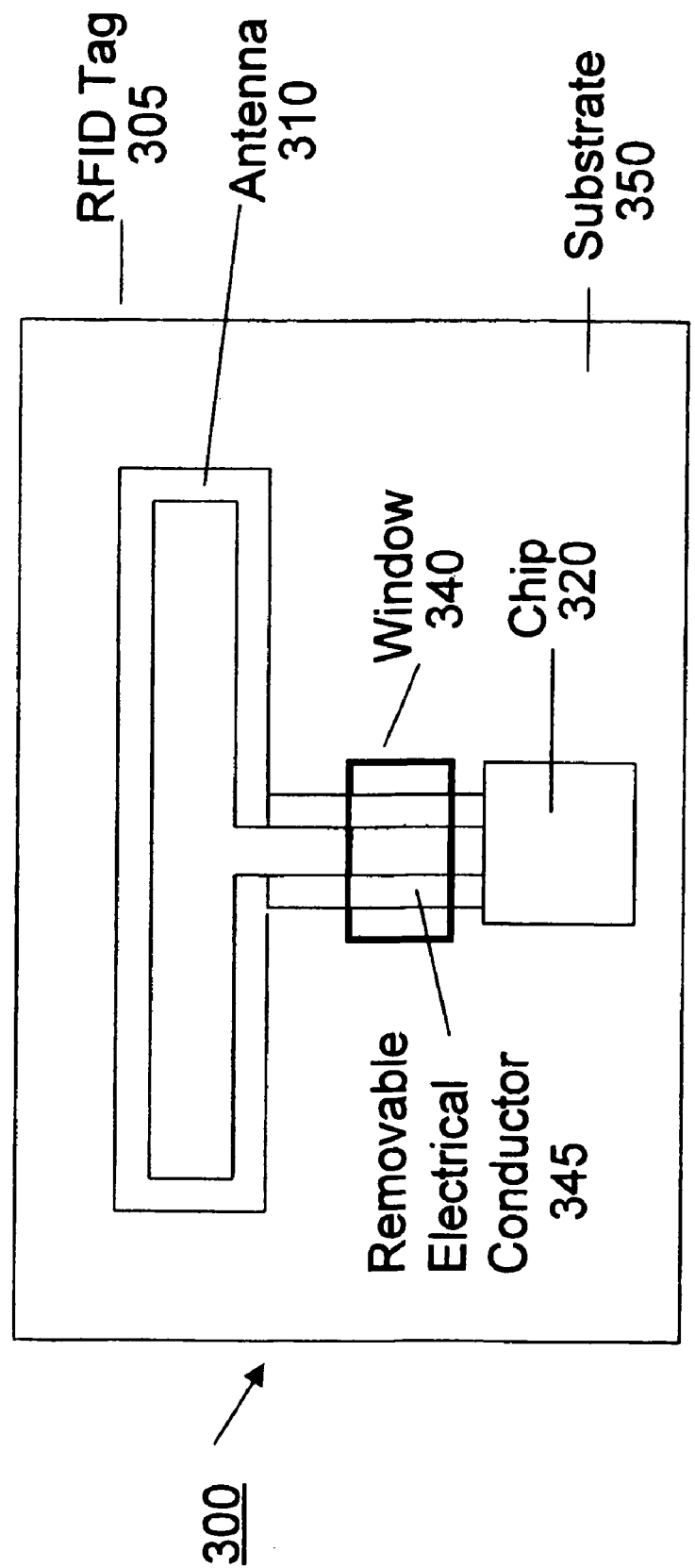
FIG. 3 is an example of an RFID tag, whose antenna is constructed of a scratch-off conducting material.

FIG. 3 is an example of an RFID tag that may be disabled by a mechanical means 300. In this embodiment, the antenna is constructed of conducting "scratch-off material". Such material is familiar to consumers in its use to obscure printed material on lottery tickets. Behm et. al. describe the use of such material to construct scratch-off circuits to use in lottery ticket applications, U.S. Pat. No. 5,599,046, and document verification, U.S. Pat. No. 5,997,044, herein incorporated by reference. Ask, France, (http://www.ask.fr/uk/technology/ask_technology.html) is a company that manufactures printed conducting circuits.

In our system, the antenna 310 of the RFID tag 305 is manufactured upon a substrate 350 using the scratch off material. The substrate 350 or mounting means may be a plastic material such as polyimide or polyester. The chip 320, also called a memory chip, is mounted on the substrate and is connected to the antenna 310 by an electrical conductor or conductors 345. The RFID tag is manufactured in such a way that some or all of the antenna or its connecting wiring is exposed. The electrical conductor or conductors 345 pass through a window 340, e.g. an exterior portion of the substrate or mounting means. For instance, an open window 340 in a covering substrate may be built into the tag at or in the region of the connection of the antenna 310 to the chip 320. Such tags are placed on the article or on its packaging in such a way that the antenna or the antenna chip connection may be scratched-off using a coin, a fingernail, or other such object. Thus, the consumer or a check-out attendant in a retail establishment, may perform the scratch-off operation to disable interrogation of the tag. The tag is open for visual observation for the confirmation of the disabling of the tag.

Figure 4:
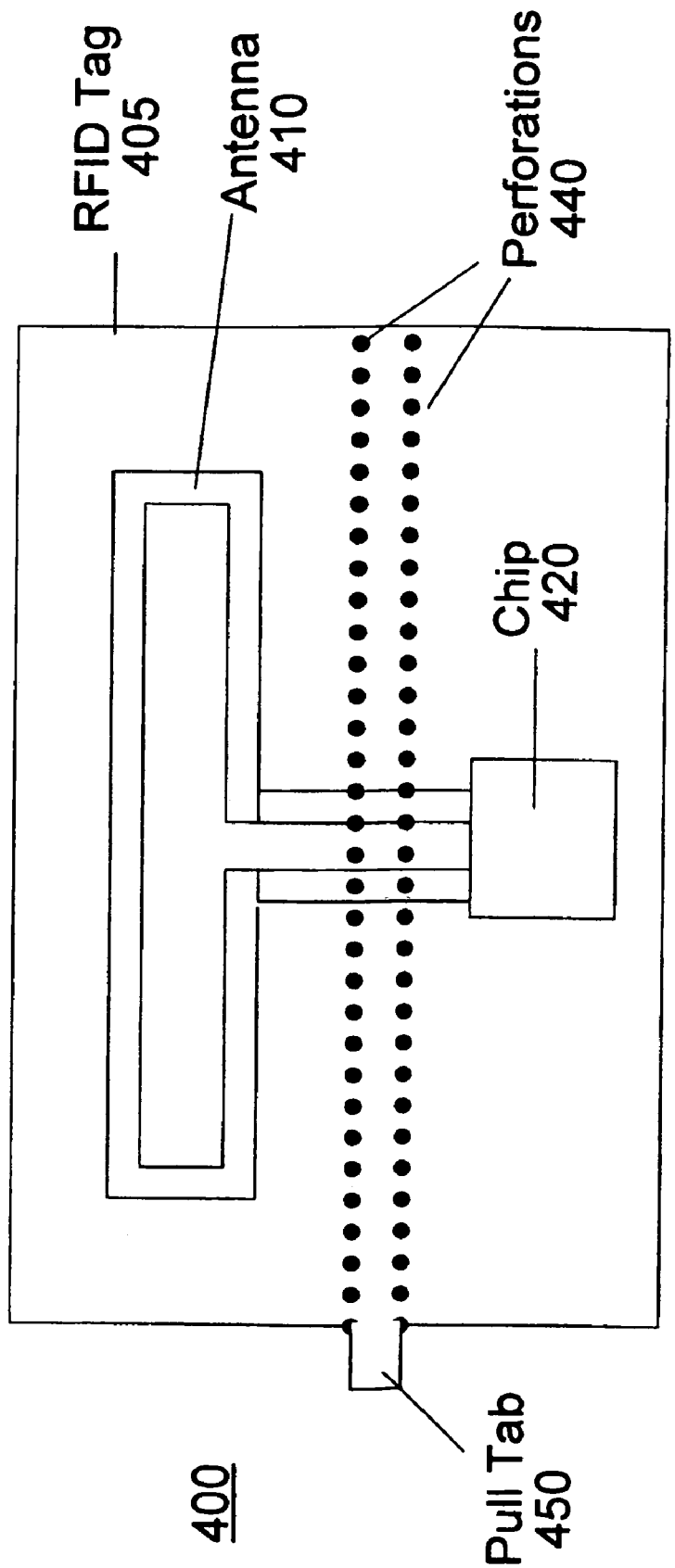
FIG. 4 shows an RFID tag in which the antenna may be disconnected by mechanical means.

FIG. 4 shows a second embodiment 400. Perforations 440 such as those used to enable the separation of postage stamps from each other are manufactured into the antenna and its substrate in such a manner that a separation along a line of perforations, separates the antenna 410 from the chip 420, or a sufficient portion of the antenna from itself so as to disable the RFID tag 405. A single or double line of perforations may be designed into the structure. A pull tab 450 may be added to facilitate the separation. In this embodiment a double line of perforations is employed. Thus, the consumer or a check-out attendant in a retail establishment, may perform the separation operation to disable the tag. The tag is open for visual observation for the confirmation of the disabling of the tag. There may also be an auxiliary specialized reader in the retail establishment to give additional confirmation that the tag has been destroyed or permanently disabled. Here, the customer can place the item with the tag within the reading range of the special reader to further ascertain that the tag can no longer be read. This reader could simply give a signal such as a continuous blinking light or the like to indicate that the tag which is within the proper range of the special reader is not sending back a signal, i.e. is not being read.

Figure 5:
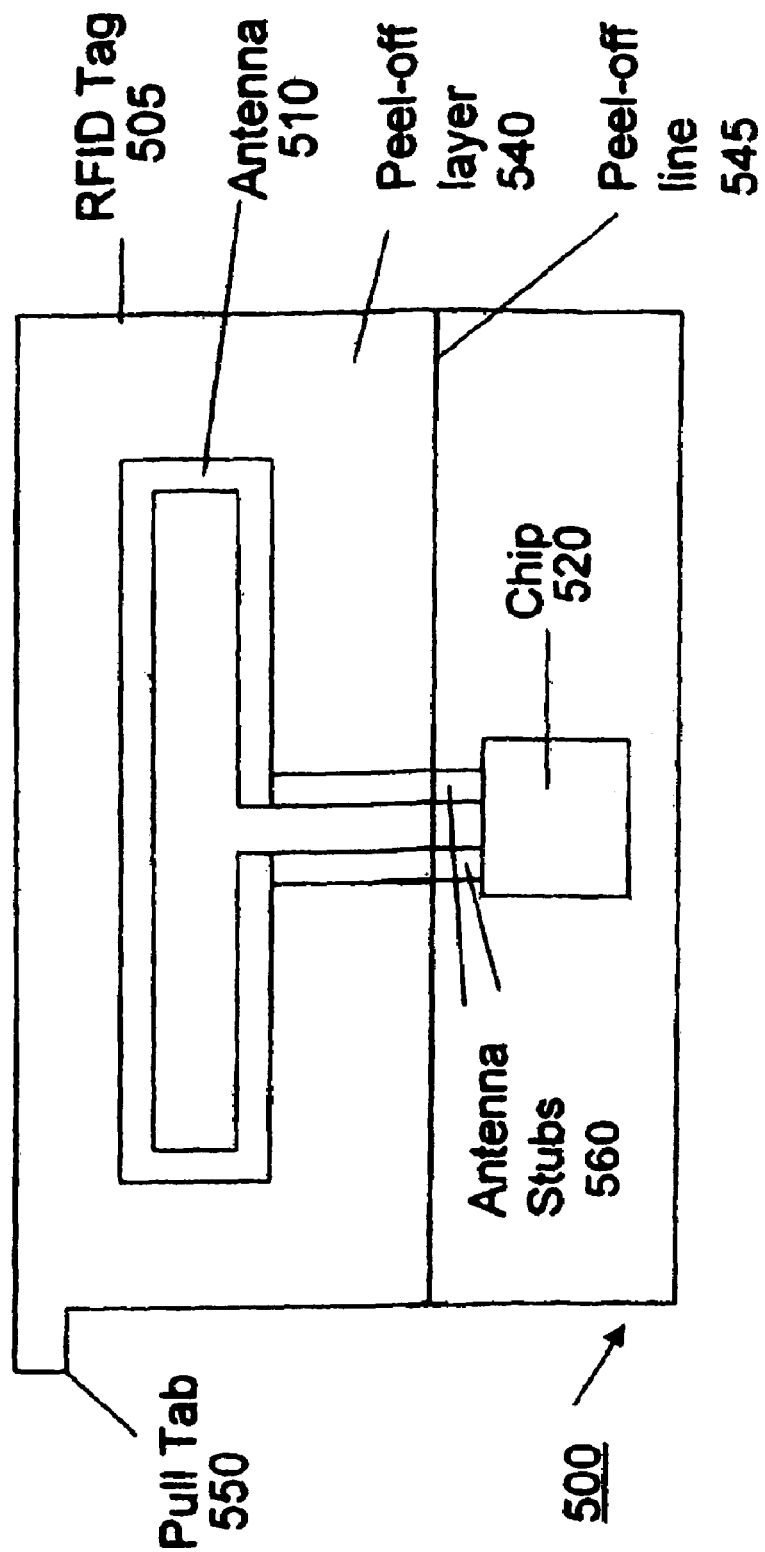
FIG. 5 shows an RFID tag in which the antenna may be removed by mechanical means.

FIG. 5 shows a third embodiment 500. The antenna 510 or portion of the antenna is sandwiched between two layers of packaging material. The sandwich is manufactured in such a manner that the adhesion of the antenna to the upper layer of the packaging material is greater than its adhesion to the lower layer which in turn is affixed to the purchased item. This produces a peel-off layer 540 affixed by an adhesive material or layer to the antenna. The antenna is removed or destroyed, e.g. delaminated, by pulling the upper layer of material from the tag 505, removing the antenna with it. A pull tab 550 connected to the upper layer of packaging is used to facilitate the delamination process. The tag may be designed in such a way that only a portion of the antenna is removed, the portion that is above the peel-off line 545. This leaves a pair of short antenna lines, or stubs, 560 attached to the chip 520.

Another method for disabling the tag is one where the antenna is formed on a decal with the ends of the antenna in electrical contact with the connecting stubs. Removal of the decal removes the antenna thereby disabling the chip from receiving any wireless radio frequency communication.

Under normal circumstances, the above mentioned methods of removing all or a portion of the antenna would disable the functioning of the antenna and thus the functioning of the RFID tag or transponder in such a way that interrogation of the tag by wireless means is essentially no longer feasible (but see further below). However, the remaining short antenna stubs 550 may be electrically contacted by mechanical probes (the probes electrically connected to one another) allowing the reading of the tag through an ohmic contact directly to the stubs. These probes may have sharp or sharpened ends in order to pierce any thin protective layer overlaying the portion of the antenna or stubs still remaining after previous disablement, i.e. resulting from tearing off or destroying the major portion of the antenna as previously described. Thus, even if a tag is functionally disabled from a wireless point-of-view, a consumer may allow the tag to be read, for example, by a retail establishment when an item that the tag is attached to is returned for a refund or credit (but see further below). Again, the successful disabling of the tag may be confirmed by visual inspection or through use of the auxiliary reader described above.

In accordance with at least one presently preferred embodiment of the present invention, there is broadly contemplated herein the altering interrogation characteristics of RFID tags to such an extent that they may still be read at a close range instead of the original range, and this result of this altering is visible to the consumer. To this end, it should be noted that any discussion of "deactivation" or "disabling", as set forth heretofore, may be considered to embrace a notion of "functionally" or "effectively" deactivating or disabling a RFID tag. In this vein, it can certainly be appreciated that if a tag is deactivated or disabled in a manner as discussed heretofore in connection, for example, with the embodiments encompassed by FIGS. 1-5, that the deactivated/disabled tag will not respond to a wireless signal in the large majority of a normally operable range (i.e., within a range that had been sufficient for tag response prior to deactivation/disablement). However, in accordance with at least one embodiment of the present invention, it can be appreciated that a tag deactivated or disabled as described heretofore will still be able to function within a comparatively very short range. As such, the ability of a base station or reader to interrogate an RFID tag (or transponder) in a wireless manner is greatly reduced but not eliminated.

In this vein, a RFID tag may still be read, but at a much shorter distance since there still remains some degree of antenna structure. With the antenna structure altered, a "long range" tag (e.g., a tag operable within ranges of 1 to 10 meters) can be transformed into a "short range" tag (e.g., one having a "read range" of about a few centimeters). Accordingly, and by way of illustrative and non-restrictive examples, if a tag is altered in a manner similar to that set forth in any of FIGS. 3-5, the remaining antenna structure, as truncated and extending from a chip, , will normally still be sufficient to allow the tag to operate as a very short-range tag, while this state or result will be completely visible and apparent to the consumer.

Figure 6:
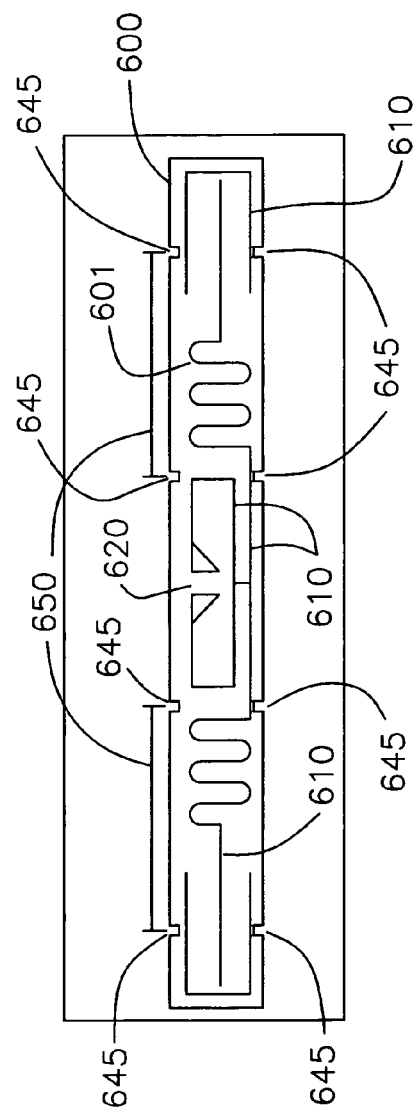
FIG. 6 shows a UHF RFID tag in which portions of the antenna may be removed by tearing.

In accordance with an alternative embodiment of the present invention, FIG. 6 illustrates a UHF (ultra high frequency) RFID tag 600 that may be altered in the manner just described. (The tag shown is of a design similar to a UHF RFID tag manufactured by Alien Technology.) As shown a tag substrate 601 includes a chip structure 620 thereon and an antenna structure 610 extending in different directions from the chip structure 620. Notches, perforations, or slits 645 may be included to facilitate tearing. If they are notches, they may be of any of a wide variety of shapes, such as square, triangular or rectangular notches.

Suitable pull tabs 650 may be provided in the vicinity of one or more notches/perforations to further facilitate tearing.

Figure 7:
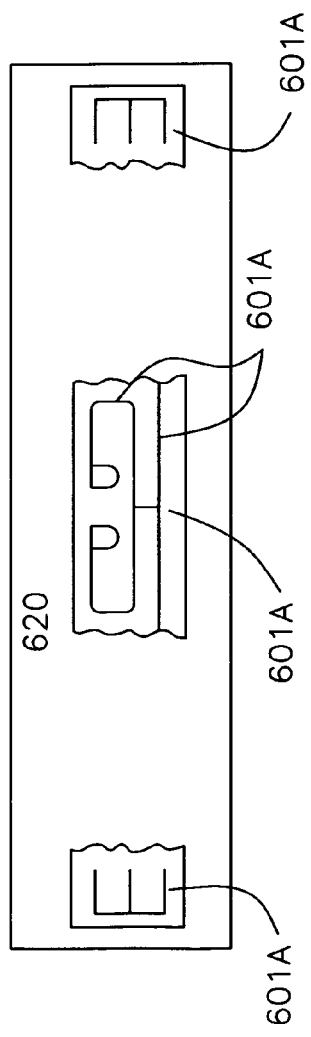
FIG. 7 shows the same tag as FIG. 6 but with antenna portions removed.

Accordingly, should a user tear off portions of the tag with the assistance of pull tabs and notches/perforations, the result can be a visibly altered tag as shown in FIG. 7, where the tag substrate 601 from FIG. 6 is now in multiple portions 601a. As can be appreciated, the remaining chip structure 620 and truncated antenna structure extending therefrom 610a are still sufficient for permitting the tag to respond to wireless signals at a very close range. For instance, with a tag length of about 10 cm, the original tag shown in FIG. 6 may have a range of more than about 2 meters with a handheld reader whereas the altered tag shown in FIG. 7 may have a range of less than about 5 centimeters.

Figure 9:
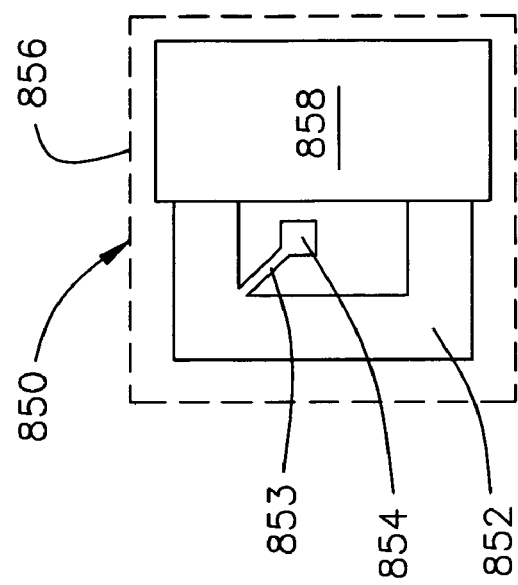
FIG. 9 shows the same tag as FIG. 8 but with the antenna portion partially covered.
Figure 8:
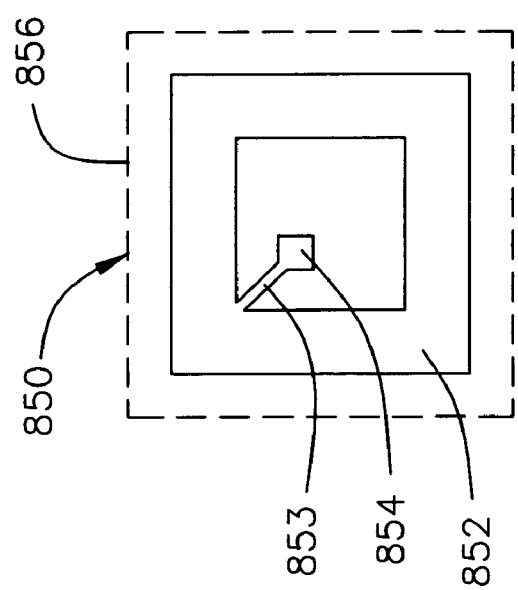
FIG. 8 shows a resonant RFID tag.

FIGS. 8 and 9 illustrate another embodiment of the present invention. As shown, a high frequency (HF) resonant tag arrangement 850 may include an antenna 852 and chip 854 disposed in packaging 856. Antenna 852 is shown schematically here but, as known, is preferably embodied by a wire coil. Antenna 852 is electrically connected to chip 854 via a suitable connection 853. Per usual, chip 854 preferably holds information about a physical object to which the tag arrangement 850 is to be attached, antenna 852 is configured for transmitting information to a reader via radio waves, while packaging 856 encases the chip 854 and antenna 852 to faciliatate attachment to a physical object.

As shown in FIG. 9, the read range of the resonant tag arrangement 850 can be reduced by covering a portion of antenna 852 with a covering element 858. Covering element 858 may be embodied, e.g., by insulated foil or insulated conducting foil made from a material such as copper, aluminum or another metal. Covering element 858 may also have an adhesive backing that would enable it to be selectively removed from tag arrangement 850. Essentially, the effect of covering element 858 is to detune the antenna 852 and move its resonant frequency away from a pre-specified frequency such that the read range of the tag arrangement 850 can be reduced to any desired limit. It will thus be appreciated that if the entire tag antenna 852 were to be covered, the read range may be reduced to zero. As such, by covering portions of antenna 852, the read range of antenna 852 can be reduced considerably such that, e.g., a tag arrangement 850 that may be read at a range of up to 50 cm can be transformed one that can only be read at 5 cm or less. This technique may also be applied to HF or UHF tags or tags of any frequency.

Figure 11:
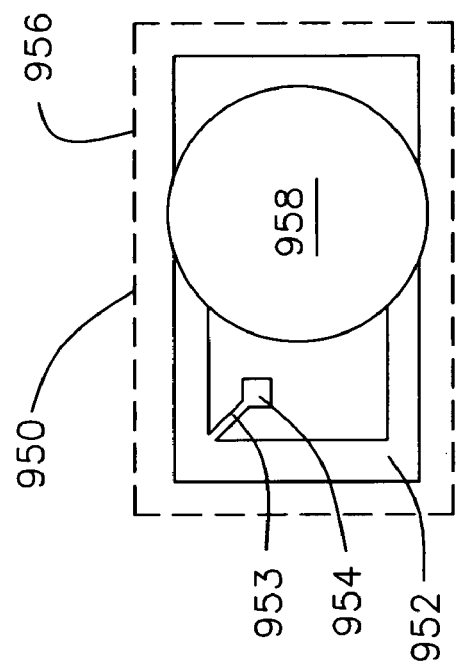
FIG. 11 shows the same tag as FIG. 10 but with the antenna portion partially covered.
Figure 10:
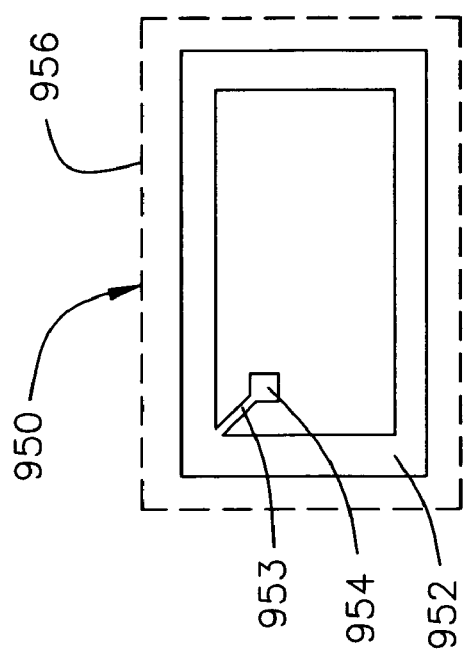
FIG. 10 shows a resonant RFID tag.

FIGS. 10 and 11 show a similar arrangement as in FIGS. 8 and 9, with corresponding reference numerals advanced by 100. The tag arrangement 950 illustrated in FIGS. 10 and 11 is akin to the "TAG-IT" arrangement manufactured by Texas Instruments. Given a longitudinal dimension of about 3 inches, and with an initial range of about 30 cm, in this case a substantially circular covering element 958, when disposed substantially as shown, can reduce the read range of antenna 952 to about 6 cm. Covering element 958 here could be embodied, e.g., by a metal-on-paper sticker with adhesive that is configured for facilitating its subsequent removal from the tag arrangement 950.

It is noted that the foregoing has outlined some of the more pertinent objects and embodiments of the present invention. The embodiments of the present invention may be employed for many applications. Thus, although the description is made for particular Arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method of altering interrogation characteristics of a resonant tag, said method comprising the steps of:
   obtaining a resonant tag, the resonant tag comprising an antenna; and
   reducing a read range of the resonant tag via physically compromising at least a portion of the antenna of the resonant tag,
   wherein said step of physically compromising comprises truncating the antenna of the resonant tag,
   wherein the resonant tag is initially operable within an original range, and
   wherein said truncating step comprises leaving a remainder of the antenna sufficient for responding to a wireless signal solely at a range shorter than the original range.

2. The method according to claim 1, wherein said step of leaving a remainder comprises leaving a remainder of the antenna sufficient for responding to a wireless signal solely at a range less than or equal to about a tenth of the original range.

3. The method according to claim 1, wherein said truncating step comprises a step taken from a group of steps consisting of: scratching off at least a portion of the antenna; removing a connection to at least one end of the antenna; peeling off a layer containing at least a portion of the antenna; and tearing off at least a portion of a substrate containing the antenna.

4. The method according to claim 1, wherein;
   said truncating step comprises tearing off at least two portions of a substrate containing the antenna, whereby at least a portion of the antenna remains connected to an input chip of the resonant tag.

5. The method according to claim 1, wherein the resonant tag comprises an ultra-high frequency RFID tag.

6. The method according to claim 1, wherein the physical compromise of at least a portion of the antenna of the resonant tag is confirmable via visual inspection.

7. A method of altering interrogation characteristics of a resonant tag, said method comprising the steps of:
   obtaining a resonant tag, the resonant tag comprising an antenna; and
   reducing a read range of the resonant tag via physically compromising at least a portion of the antenna of the resonant tag.
   wherein said step of physically compromising comprises covering at least a portion of the antenna of the resonant tag in a manner to reduce the read range of the antenna.

wherein the resonant tag is initially operable within an original range, and wherein said covering step comprises leaving uncovered a remainder of the antenna sufficient for responding to a wireless signal solely at a range shorter than the original range.

8. The method according to claim 7, wherein said step of leaving uncovered a remainder comprises leaving uncovered a remainder of the antenna sufficient for responding to a wireless signal solely at a range less than or equal to about a fifth of the original range.

9. The method according to claim 7, wherein said covering step comprises covering at least a portion of the antenna with at least one of: insulated foil and a metal-on-paper sticker.

10. The method according to claim 7, wherein the resonant tag comprises a high frequency RFID tag.

11. The method according to claim 7, wherein the physical compromise of at least a portion of the antenna of the resonant tag is confirmable via visual inspection.

12. A resonant tag kit comprising:

a resonant tag;

said resonant tag comprising an antenna; and an arrangement for reducing a read range of said resonant tag via physically compromisng at least a portion of said antenna, wherein said arrangement for reducing a read range comprises an arrangement for facilitating truncating said antenna, wherein said resonant tag is initially operable within an original range, and wherein said arrangement for facilitating truncating is adapted to leave a remainder of said antenna sufficient for responding to a wireless signal solely at a range shorter than the original range.

13. The resonant tag kit according to claim 12, wherein said arrangement for facilitating truncating is adapted to leave a remainder of said antenna sufficient for responding to a wireless signal solely at a range less than or equal to about a tenth of the original range.

14. The resonant tag kit according to claim 13, wherein said arrangement for facilitating truncating comprises an arrangement taken from a group consisting of the following arrangements: an arrangement for facilitating the scratching off of at least a portion of said antenna; an arrangement for facilitating the removal of a connection to at least one end of said antenna; a peelable layer portion containing at least a portion of said antenna; and a tearable substrate portion containing said antenna.

15. The resonant tag kit according to claim 12, further comprising:

a substrate which presents said antenna;

said arrangement for facilitating truncating comprises an arrangement for facilitating the tearing off at least two portions of said substrate, whereby at least a portion of the antenna remains connected to an input chip of the resonant tag.

16. The resonant tag kit according to claim 15, wherein said arrangement for facilitating tearing off comprises:

notches, slits or perforations for facilitating tearing of said substrate; and pull tabs associated with portions of said substrate to be torn off.

17. The resonant tag kit according to claim 12, wherein said resonant tag comprises an ultra-high frequency RFID tag.

18. The resonant tag kit according to claim 12, wherein the physical compromise of at least a portion of said antenna of the resonant tag is confirmable via visual inspection.

19. A resonant tag kit comprising:

a resonant tag;

said resonant tag comprising an antenna; and an arrangement for reducing a read range of said resonant tag via physically compromising at least a portion of said antenna, wherein said arrangement for reducing a read range comprises an arrangement for covering at least a portion of said antenna in a manner to reduce the read range of said antenna, wherein said resonant tag is initially operable within an original range, and wherein said covering arrangement is adapted to leave uncovered a remainder of the antenna sufficient for responding to a wireless signal solely at a range shorter than the original range.

20. The resonant tag kit according to claim 19, wherein said covering arrangement is adapted to leave uncovered a remainder of the antenna sufficient for responding to a wireless signal solely at a range less than or equal to about a fifth of the original range.

21. The resonant tag kit according to claim 19, wherein said covering arrangement comprises at least one of: insulated foil and a metal-on paper sticker.

22. The resonant tag kit according to claim 19, wherein said resonant tag comprises a high frequency RFID tag.

23. The resonant tag kit according to claim 19, wherein the physical compromise of at least a portion of said antenna of the resonant tag is confirmable via visual inspection.

* * * * *